United States Patent
Johnson et al.

(10) Patent No.: US 11,233,820 B2
(45) Date of Patent: Jan. 25, 2022

(54) SYSTEMS AND METHODS FOR DETECTING PHISHING WEBSITES

(71) Applicant: PAYPAL, INC., San Jose, CA (US)

(72) Inventors: Raoul Johnson, Scottsdale, AZ (US); Penghui Zhang, Phoenix, AZ (US); Adam Oest, Scottsdale, AZ (US); Bradley Wardman, Phoenix, AZ (US)

(73) Assignee: PayPal, Inc., San Jose, CA (US)

( * ) Notice: Subject to any disclaimer, the term of this patent is extended or adjusted under 35 U.S.C. 154(b) by 197 days.

(21) Appl. No.: 16/566,537

(22) Filed: Sep. 10, 2019

(65) Prior Publication Data
US 2021/0075826 A1 Mar. 11, 2021

(51) Int. Cl.
*H04L 9/00* (2006.01)
*H04L 29/06* (2006.01)

(52) U.S. Cl.
CPC ...... *H04L 63/1483* (2013.01); *H04L 63/1416* (2013.01); *H04L 63/1433* (2013.01); *H04L 63/1475* (2013.01); *H04L 63/168* (2013.01); *H04L 63/20* (2013.01)

(58) Field of Classification Search
CPC ............. H04L 63/1483; H04L 63/1416; H04L 64/1433; H04L 63/1475; H04L 63/168; H04L 63/20
USPC ......................................................... 726/22
See application file for complete search history.

(56) References Cited

U.S. PATENT DOCUMENTS

| | | |
|---|---|---|
| 8,307,276 B2 * | 11/2012 | Repasi ................. H04L 63/123 715/234 |
| 2003/0131048 A1 | 7/2003 | Najork |
| 2007/0094500 A1 | 4/2007 | Shannon et al. |
| 2009/0235360 A1 | 9/2009 | Hamilton, II et al. |
| 2010/0186088 A1 * | 7/2010 | Banerjee ............ H04L 63/1441 726/23 |
| 2011/0055922 A1 | 3/2011 | Cohen et al. |
| 2012/0102545 A1 | 4/2012 | Carter, III et al. |
| 2013/0086677 A1 | 4/2013 | Ma et al. |
| 2015/0067832 A1 | 3/2015 | Sastry |
| 2016/0261618 A1 | 9/2016 | Koshelev |
| 2017/0034211 A1 | 2/2017 | Buergi et al. |
| 2017/0195293 A1 | 7/2017 | Dahan et al. |
| 2017/0195363 A1 | 7/2017 | Dahan et al. |
| 2017/0237753 A1 | 8/2017 | Dawson |
| 2017/0277891 A1 * | 9/2017 | Keppler ................ G06F 21/552 |
| 2018/0033089 A1 | 2/2018 | Goldman |

(Continued)

*Primary Examiner* — Christopher J Brown
(74) *Attorney, Agent, or Firm* — Haynes and Boone, LLP

(57) ABSTRACT

Methods and systems are presented for detecting malicious webpages based on dynamically configuring a device to circumvent one or more evasion techniques implemented within the malicious webpages. When a known malicious webpage is obtained, programming code of the known malicious webpage is analyzed to determine one or more evasion techniques implemented within the known malicious webpage. The one or more evasion techniques may cause a webpage classification engine to falsely classify the known malicious webpage as a non-malicious webpage. A software update is generated based on one or more feature parameters extracted from the one or more evasion techniques. The software update is used to for modify the webpage classification engine such that the webpage classification engine would correctly classify the known malicious webpage.

20 Claims, 7 Drawing Sheets

(56) References Cited

U.S. PATENT DOCUMENTS

| | | |
|---|---|---|
| 2018/0084008 A1 | 3/2018 | Nataraja |
| 2018/0124109 A1* | 5/2018 | Hunt ................. G06K 9/00442 |
| 2018/0191777 A1 | 7/2018 | Volkov |
| 2018/0191778 A1 | 7/2018 | Volkov |
| 2018/0205758 A1 | 7/2018 | Yang et al. |
| 2019/0014149 A1 | 1/2019 | Cleveland et al. |
| 2019/0104154 A1 | 4/2019 | Kumar et al. |

* cited by examiner

SYSTEMS AND METHODS FOR DETECTING PHISHING WEBSITES

BACKGROUND

The present specification generally relates to advanced techniques for detecting characteristics of websites, and more specifically, to detecting websites that are associated with one or more phishing schemes according to various embodiments of the disclosure.

RELATED ART

Phishing has become a serious security risk for online users. It is increasingly popular among malicious users as a technique for fraudulently obtaining sensitive information, such as usernames, passwords, and funding source information (e.g., credit card numbers, etc.), from legitimate users. Phishing may be implemented in different ways. In one example, a phishing scheme can be carried out by generating a malicious website that imitates the appearance of another, legitimate website associated with an entity (e.g., a bank, a service provider, a merchant, etc.). Due to a similar appearance with a legitimate website, the malicious website tricks users into believing that they are accessing the legitimate website, and the users thus may provide sensitive information via the interface of the malicious website.

Applicant recognizes that detecting a website that is being used for phishing purposes can be difficult, as the use of various evasion techniques (e.g., cloaking techniques) makes it increasingly challenging to detect websites that are associated with a phishing scheme. Thus, there is a need for advanced website classification mechanisms for detecting phishing websites especially when various evasions techniques are implemented within the phishing websites.

Figure 1:
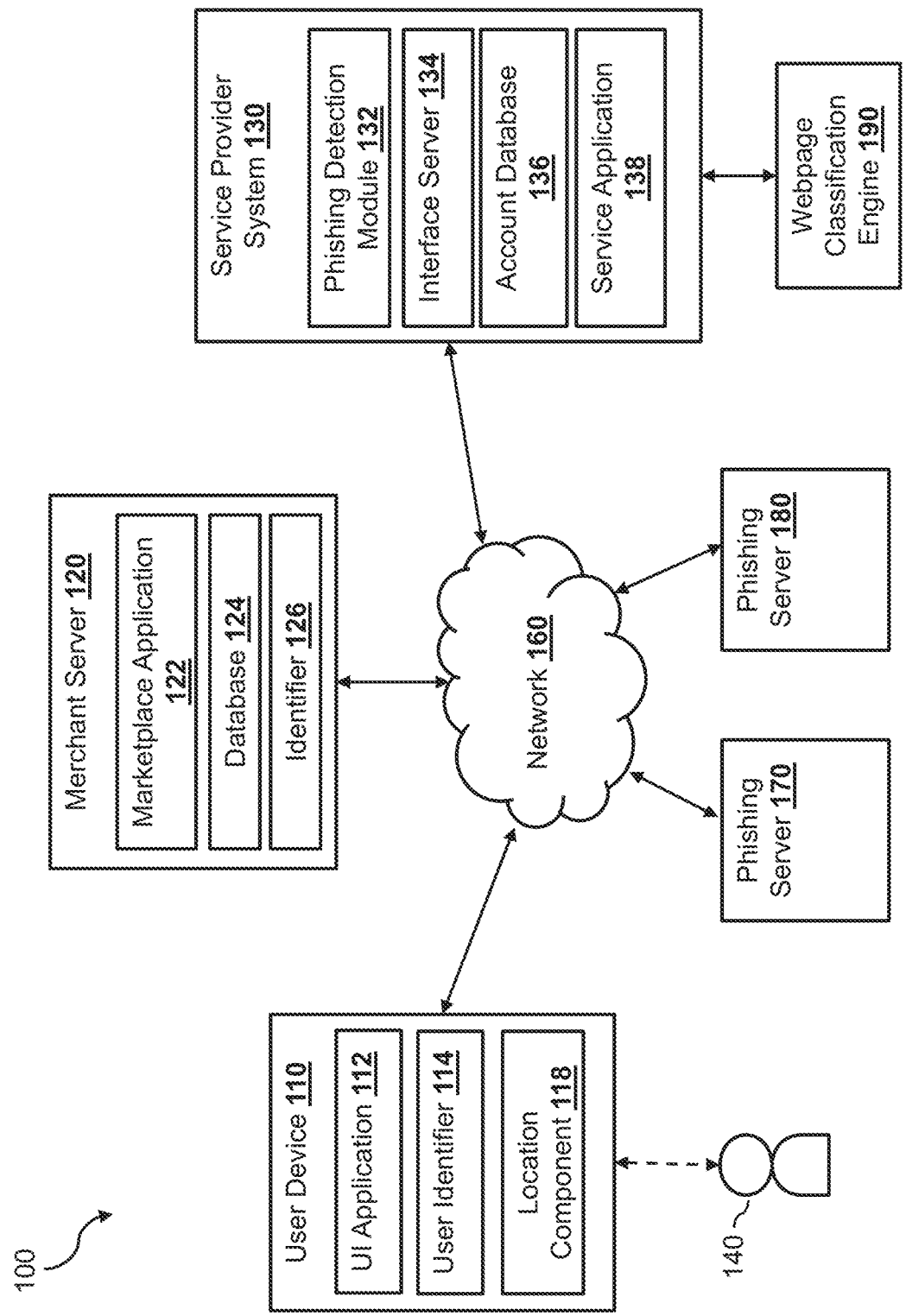
FIG. 1 is a block diagram illustrating a phishing webpage detection system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for detecting malicious websites (e.g., websites associated with a phishing scheme, also referred to as "phishing websites," etc.) based on dynamically configuring a device for accessing the malicious websites to circumvent one or more evasion techniques implemented within the malicious websites. If detected by an automated webpage classification system, efforts can be made to shut down or prevent access to a malicious website. Such a webpage classification system may access various websites (e.g., by using a crawler) and classify the websites as either a malicious website (e.g., a phishing website) or a non-malicious website (e.g., a non-phishing website). In some embodiments, the webpage classification system may use a device (e.g., a personal computer, a server, a mobile device, etc.) to access a website, analyze the content associated with the website (e.g., visual content presented on the device when accessing the website), and determine whether the website is associated with a phishing scheme. For example, the webpage classification system may analyze the visual content presented on the device when accessing the website to determine whether the visual content corresponds to content of a different, legitimate website (e.g., whether the website includes a particular logo, whether the layout of the website corresponds to the layout of the legitimate website, whether the website includes input fields for obtaining data from a user, etc.).

In order to avoid detection by the webpage classification system, operators of the malicious websites may implement one or more evasion techniques (e.g., cloaking techniques) in the malicious websites. Such cloaking techniques include, for example, incorporating programming scripts such as JavaScript® into the programming code of the malicious websites. Evasion techniques, when implemented within a malicious website, may cause different devices that attempt to access the malicious website to be presented with different content, based on different configurations (e.g., different device parameters) associated with the different devices and/or different interactions performed through the different devices. For example, the malicious website may be configured to present different content based on one or more factors, such as type of application used to access the website (e.g., a type of web browser, a version of a type of web browser, etc.), a geographical location of the device, an Internet Protocol (IP) address associated with the device, a browser language of the browser used to access the website, an operating system, a browser application type, a parameter associated with an interaction performed though the device (e.g., a mouse movement, a click, etc.), and other factors associated with the device.

As a more specific example of cloaking, consider a phishing website that seeks to gather login information (username, password) for users of a bank that only has operations in Germany. When that phishing website detects that an IP address located in Germany is trying to access content, a phishing login page may be shown that mimics the look and feel of the bank's legitimate website. In order to avoid detection, however, the phishing website might present different content when an IP address indicates that a device requesting content is located in the United States. Likewise, if the accessing IP address is known to correspond to a computer security company, for example, then the phishing website may present different content.

A phishing website may also try to detect whether a physical human being is manually accessing a webpage via a consumer computing device (e.g. laptop, smartphone), or whether an access attempt is coming from a different source such as a virtual machine (VM) implemented on a computer server. If the access attempt is coming from a VM, the phishing website may provide innocuous (non-phishing) content, on the assumption that an access coming from a VM may be a security scan that is trying to detect phishing.

Thus, malicious websites may be configured to present phishing content (e.g., content for fraudulently obtaining sensitive information from users) only to devices that satisfy a set of conditions (e.g., the devices are located within a geographical region, the devices have IP addresses within one or more predetermined ranges, the devices that perform one or more predetermined actions, etc.) and to present non-phishing content (e.g., content that does not imitate a legitimate website, etc.) to devices that do not satisfy the set of conditions. In one example, the set of conditions are determined based on characteristics (e.g., device parameters) associated with the webpage classification system (and/or other known webpage classification systems) such that non-phishing content would be presented on devices associated with the webpage classification system when accessing the malicious website. As such, the evasion techniques may cause the webpage classification system to incorrectly classify malicious webpages (e.g., lead to false negatives in the detection of malicious websites).

Accordingly, in some embodiments, a phishing detection system may analyze evasion techniques used in one or more malicious websites and may configure and/or modify the webpage classification system to circumvent the evasion techniques when accessing the malicious webpages. For example, the phishing detection system may obtain programming code of a webpage that is known to be part of a phishing website (i.e., script code that is part of a webpage). The phishing detection system may then analyze the programming code of the webpage. In some embodiments, the phishing detection system may determine that the webpage includes programming code associated with one or more evasion techniques. Since evasion techniques in most instances involve presenting different content based on different conditions, the phishing detection system may analyze the programming code to determine whether one or more conditional statements exists (e.g., by analyzing programming scripts within the programming code of the webpage). The conditional statements may be used to determine whether a set of conditions associated with a device accessing the webpage is satisfied.

For example, a webpage may be configured to present first content (e.g., phishing content) on the device when it is determined that the set of conditions is satisfied and present second content (e.g., non-phishing content) on the device when it is determined that the set of conditions is not satisfied. As discussed above, the set of conditions may be associated with one or more configurations (e.g., device parameters) of the device (e.g., an application type of an application used to access the webpage, a geographical location of the device, an Internet Protocol (IP) address associated with the device) and/or an interaction performed through the device (e.g., a mouse movement, a click, a timing between interactions, etc.), and other factors.

The phishing detection system may then extract the set of conditions (e.g., the one or more conditional statements) from the programming code, and may modify the webpage classification system based on the extracted set of conditions. For example, when the phishing detection system determines that the set of conditions includes a geographical condition that requires the device to be within a particular geographical region before presenting the phishing content, the phishing detection system may modify the webpage classification system such that the device associated with the webpage classification system is configured to imitate the device being located at a location within the particular geographical region (e.g., through the use of a virtual private network (VPN), etc.). In another example when the phishing detection system determines that the set of conditions includes an IP address condition that requires the device to have an IP address within one or more ranges of IP addresses, the phishing detection system may modify the webpage classification system such that the device associated with the webpage classification system may spoof, to the website, that the device is associated with an IP address within the one or more ranges of IP addresses.

More particularly, client-side device-related conditions can be varied by the phishing detection system, in various embodiments. When the phishing detection system determines that the set of conditions includes an interaction condition that requires a mouse of the device to move in a predetermined manner before presenting the phishing content, for example, the phishing detection system may modify the webpage classification system such that the device associated with the webpage classification system is configured to move the mouse (or mimic a mouse movement) in the predetermined manner when accessing the webpages. A screen width (in pixels) could also be simulated by the phishing detection system, as another example, in order to make a virtual machine-based system operating from a back-office server rack system look more like a laptop computer that would typically be used by an individual end user. (E.g., instead of reporting a browser pixel screen width of 0, the phishing detection system might report a browser pixel screed width of 1920 pixels).

In some embodiments, modifying of the webpage classification system may include generating one or more software updates for the webpage classification system. The one or more software updates may correspond to the set of conditions extracted from the webpage. The phishing detection system may then incorporate the software patches (e.g., the set of conditions) into the webpage classification system. In some embodiments, incorporating the software updates into the webpage classification system causes the webpage classification system to configure the device to behave differently when accessing the webpages (for detecting malicious webpages).

To detect whether a webpage is a malicious webpage (e.g., includes phishing content), the webpage classification system may first generate a set of different device configurations for configuring a device that accesses the webpage. Each configuration may correspond to one or more of the different conditions (different device parameters). The webpage classification system may then use the device to access the webpage under the set of different configurations. For example, the webpage classification system may configure the device according to a first configuration, and may use the device to access the webpage. The webpage classification system may determine, based on the content associated with the webpage presented on the device, whether the webpage is a malicious webpage. If it is determined that the webpage is not a malicious webpage, the webpage classification system may configure the device according to a second configuration, and may use the device to access the webpage again. The webpage classification system may determine, based on the content associated with the webpage presented on the device, whether the webpage is a malicious webpage. The webpage classification system may continue to configure the device according to other configurations it generates to access the webpage until either the webpage classification system detects that the webpage includes phishing content (in which case the webpage classification system may classify the webpage as a malicious webpage) or the webpage classification system has exhausted the set of different configurations (in which case the webpage classification system may classify the webpage as a non-malicious webpage).

In some embodiments, when the phishing detection system obtains the webpage that is known to be part of a phishing website, the phishing detection system may first feed the webpage to the webpage classification system to determine whether the webpage classification system can detect that the webpage is a malicious webpage without any modifications. If the phishing detection system determines that the webpage classification system can detect that the webpage is a malicious webpage (e.g., classifying the webpage as a malicious webpage), the phishing detection system may not need to analyze the webpage and modify the webpage classification system. However, if the phishing detection system determines that the webpage classification system cannot detect that the webpage is a malicious webpage (e.g., classifying the webpage as a non-malicious webpage), the phishing detection system may determine that one or more evasion techniques implemented within the webpage successfully "fooled" the webpage classification system. Thus, the phishing detection system may use the techniques described herein to analyze the webpage, generate software updates, and modify the webpage classification system based on the software updates.

After modifying (e.g., updating) the webpage classification system, the phishing detection system may again feed the webpage to the webpage classification system to verify that the webpage classification system can detect the webpage as a malicious webpage.

FIG. 1 illustrates an online system 100, within which the phishing detection system and the webpage classification system may be implemented according to one embodiment of the disclosure. The online system 100 includes a service provider system 130, a webpage classification engine 190, a merchant server 120, one or more phishing servers (e.g., phishing server 170 and phishing server 180), and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider system 130 over the network 160. For example, the user 140 may use the user device 110 to conduct an online purchase transaction with the merchant server 120 via a website hosted by the merchant server 120. The user 140 may also log in to a user account to access account services or conduct electronic transactions (e.g., account transfers or payments) with the service provider system 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface application 112 (e.g., a web browser, a mobile payment application, etc.), which may be utilized by the user 140 to access the websites (or other types of interfaces) associated with the merchant server 120 and the service provider system 130. In one implementation, the user interface application 112 includes a software program (e.g., a mobile application) that provides a graphical user interface (GUI) for the user 140 to interface and communicate with the service provider system 130 and/or the merchant server 120 via the network 160. In another implementation, the user interface application 112 includes a browser module that provides a network interface to browse information available over the network 160. For example, the user interface application 112 may be implemented, in part, as a web browser to view information available over the network 160.

The user device 110, in one embodiment, may include at least one identifier 114, which may be implemented, for example, an IP address, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider system 130 via the network 160, and the identifier 114 may be used by the service provider system 130 to associate the user with a particular user account (e.g., and a particular profile) maintained by the service provider system 130.

In various implementations, the user 140 is able to input data and information into an input component (e.g., a keyboard) of the user device 110 to provide user information with a transaction request, such as a login request, a fund transfer request, a request for adding an additional funding source (e.g., a new credit card), or other types of request. The user information may include user identification information.

The user device 110, in various embodiments, includes a location component 118 configured to determine, track, monitor, and/or provide an instant geographical location of the user device 110. In one example, the location information may be directly entered into the user device 110 by the user via a user input component, such as a keyboard, touch display, and/or voice recognition microphone. In another example, the location information may be automatically obtained and/or provided by the user device 110 via an internal or external monitoring component that utilizes a global positioning system (GPS), which uses satellite-based positioning, and/or assisted GPS (A-GPS), which uses cell tower information to improve reliability and accuracy of GPS-based positioning. For example, location information may be obtained by checking in using the user device 110 via a check-in device at a location or in an authentication process to determine if a request coming from the user device 110 is fraudulent or valid.

Even though only one user device 110 is shown in FIG. 1, it has been contemplated that one or more user devices (each similar to user device 110) may be communicatively coupled with the service provider system 130 via the network 160 within the system 100.

The merchant server 120, in various embodiments, may be maintained by a business entity (or in some cases, by a partner of a business entity that processes transactions on behalf of business entity). Examples of business entities include merchant sites, resource information sites, utility sites, real estate management sites, social networking sites, etc., which offer various items for purchase and process payments for the purchases. The merchant server 120 may include a merchant database 124 for identifying available items, which may be made available to the user device 110 for viewing and purchase by the user.

The merchant server 120, in one embodiment, may include a marketplace application 122, which may be configured to provide information over the network 160 to the user interface application 112 of the user device 110. For example, the user 140 of the user device 110 may interact with the marketplace application 122 through the user interface application 112 over the network 160 to search and view various items available for purchase in the merchant database 124. The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.). Even though only one merchant server 120 is shown in FIG. 1, it has been contemplated that one or more merchant servers (each similar to merchant server 120) may be communicatively coupled with the service provider system 130 and the user device 110 via the network 160 in the system 100.

Each of the phishing servers 170 and 180 may host an interface (e.g., as implemented via a website) that can be accessed by the user device 110 and the service provider system 130. In some embodiments, the interface hosted by each of the phishing servers 170 and 180 may imitate the appearance of an interface associated with the merchant server 120 and/or the service provider system 130 (e.g., a merchant website, a service provider website, etc.), such that when the user 140 accesses the websites hosted by the phishing servers 170 and 180, the user 140 may be tricked into believing that she is accessing the interface associated with the merchant server 120 and/or the service provider system 130. Typically, the interface hosted by the phishing servers 170 and 180 may be associated with a network address (e.g., a uniform resource locator (URL), etc.) that is similar to, but different from, the network addresses of the merchant server 120 and/or the service provider system 130, so that the user 140 may easily access the interface hosted by the phishing servers 170 and 180 by mistake. The interface hosted by the phishing servers 170 and 180 may prompt the user (e.g., the user 140) to input sensitive data via one or more data input fields (e.g., user name and password, account number, payment card information, etc.). The phishing servers 170 and 180 may obtain the sensitive data of the users via the interfaces and may use the data without the authorization of the users, and sometimes to obtain monetary benefits at the expense of the users or of the merchants and/or service providers.

The service provider system 130, in one embodiment, may be maintained by a transaction processing entity or an online service provider, which may provide processing for electronic transactions between the user 140 of user device 110 and one or more merchants. As such, the service provider system 130 may include a service application 138, which may be adapted to interact with the user device 110 and/or the merchant server 120 over the network 160 to facilitate the searching, selection, purchase, payment of items, and/or other services offered by the service provider system 130. In one example, the service provider system 130 may be provided by PayPal®, Inc., of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider system 130 may also include an interface server 134 that is configured to serve content (e.g., web content) to users and interact with users. For example, the interface server 134 may include a web server configured to host a website of the service provider system 130 and to serve web content in response to HTTP requests. As such, the interface server 134 may include pre-generated electronic content ready to be served to users. For example, the interface server 134 may store a log-in page and is configured to serve the log-in page to users for logging into user accounts of the users to access various service provided by the service provider system 130. The interface server 134 may also include other electronic pages associated with the different services (e.g., electronic transaction services, etc.) offered by the service provider system 130. As a result, a user may access a user account associated with the user and access various services offered by the service provider system 130, by generating HTTP requests directed at the service provider system 130.

In various embodiments, the service provider system 130 includes a phishing detection module 132 that implements the phishing detection system as discussed herein. The phishing detection module 132 may include, or may be communicatively coupled with, the webpage classification engine 190, which implements the webpage classification system. The webpage classification engine 190 may access webpages to detect whether the webpages are malicious webpages (e.g., include phishing content) or non-malicious webpages (e.g., do not include phishing content). The webpages that are classified as malicious webpages by the webpage classification engine 190 may be provided to a third-party entity (e.g., law enforcement agency, etc.) to shut down those webpages. However, as discussed above, the webpages hosted by the phishing servers 170 and 180 may be implemented with one or more evasion techniques (e.g., cloaking techniques) to cause the webpage classification engine 190 to incorrectly classify malicious webpages as non-malicious webpages. For example, the webpages hosted by the phishing servers 170 and 180 may not present phishing content when they are accessed by the webpage classification engine 190 based on one or more factors, such as an IP address associated with the webpage classification engine 190, a geographical location of the webpage classification engine 190, an interaction (or lack thereof) with the webpages, and/or other factors.

Thus, when the phishing detection module 132 obtains a webpage that is known to be a phishing website, the phishing detection module 132 may first provide the webpage to the webpage classification engine 190 to determine whether the webpage classification engine 190 can detect that the webpage is a malicious webpage. If the phishing detection module 132 determines that the webpage classification engine 190 can detect that the webpage is a malicious webpage (e.g., the webpage classification engine 190 classifies the webpage as a malicious webpage), the phishing detection module 132 may not perform further analysis to the webpage. On the other hand, if the phishing detection module 132 determines that the webpage classification engine 190 cannot detect that the webpage is a malicious webpage (e.g., the webpage classification engine 190 classifies the webpage as a non-malicious webpage), the phishing detection module 132 may analyze the programming code of the webpage to determine the one or more evasion techniques used in the webpage. For example, the phishing detection module 132 may extract a set of conditions required by the webpage in order to present phishing content. The phishing detection module 132 may then modify the webpage classification engine 190 based on the set of conditions, such that the webpage classification engine 190 may access the phishing content included in the webpage.

The service provider system 130, in one embodiment, may be configured to maintain one or more user accounts and merchant accounts in an account database 136, each of which may be associated with a profile and may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account, which may be used by the profile matching module 132 to match profiles to the entity. In certain embodiments, account information also includes user purchase profile information such as account funding options and payment options associated with the user, payment information, receipts, and other information collected in response to completed funding and/or payment transactions.

Figure 2:
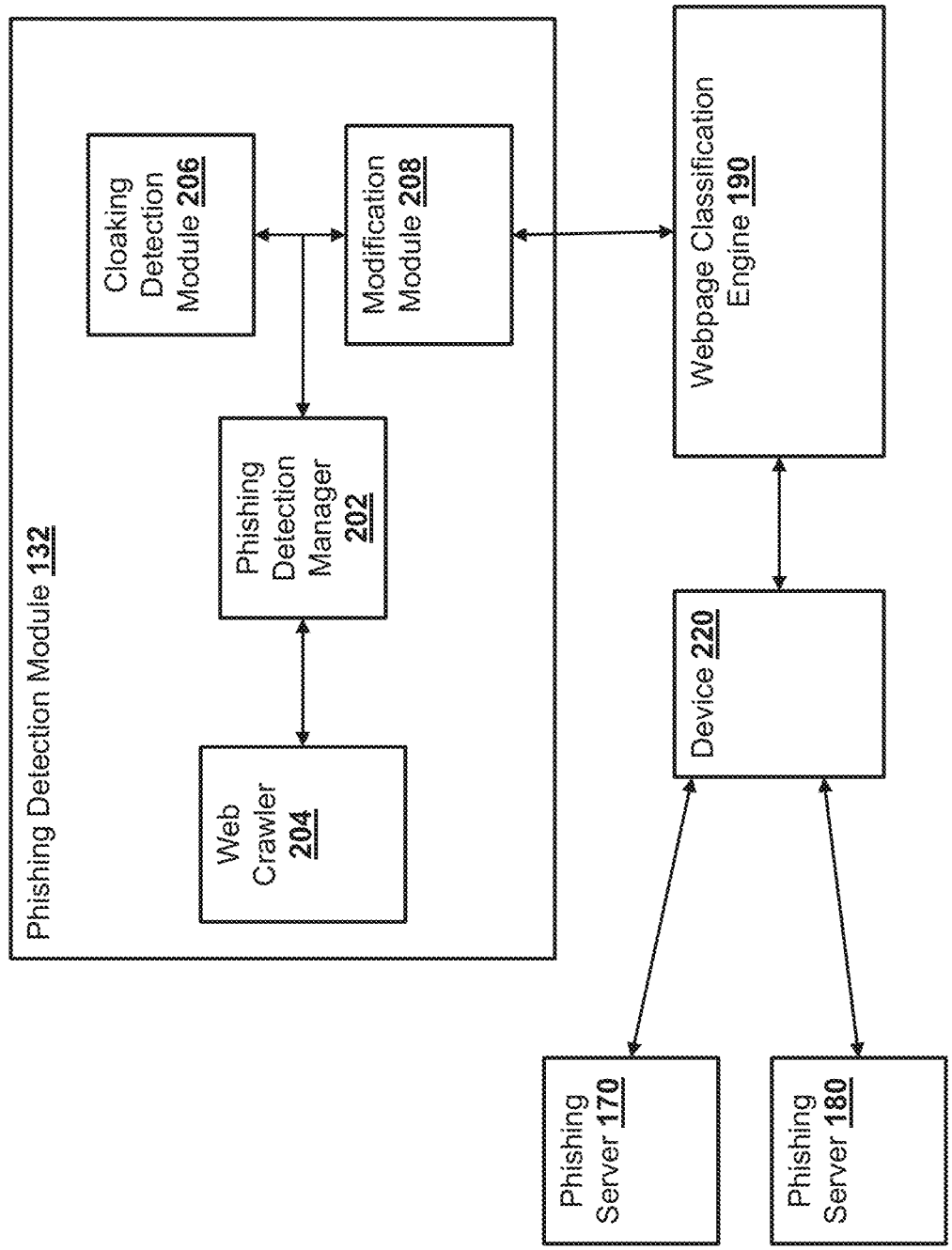
FIG. 2 is a block diagram illustrating a phishing detection module according to an embodiment of the present disclosure.

FIG. 2 illustrates a block diagram of the phishing detection module 132 according to an embodiment of the disclosure. The phishing detection module 132 includes a phishing detection manager 202, a web crawler 204, a cloaking detection module 206, and a modification module 208. In some embodiments, the phishing detection manager 202 may use the web crawler 204 to traverse the web to access various webpages. When the phishing detection manager 202 determines that a particular webpage includes phishing content, the phishing detection manager 202 may use the cloaking detection module 206 to determine whether one or more evasion techniques (e.g., cloaking techniques) have been implemented within the particular webpage. For example, the cloaking detection module 206 may determine whether the particular webpage includes conditional programming statements for presenting different visual content on a device, for example, based on one or more configuration parameters (e.g., feature parameters) of the device.

In some embodiments, the cloaking detection module 206 may determine a feature parameter (e.g., a device parameter) associated with the conditional programming statements for causing the particular webpage to present phishing content. The phishing detection manager 202 may then use the modification module 208 to modify the webpage classification engine 190 based on the feature parameter. By modifying the webpage classification engine 190, the webpage classification engine 190 may configure the device 220 using the feature parameter for accessing and/or classifying webpages, including webpages hosted by the phishing servers 170 and 180. While in some embodiments, the webpage classification engine 190 and the device 220 may be part of the service provider system 130, in some other embodiments, the webpage classification engine 190 and the device 220 are associated with a third-party entity, and may reside outside of the service provider system 130.

Figure 3:
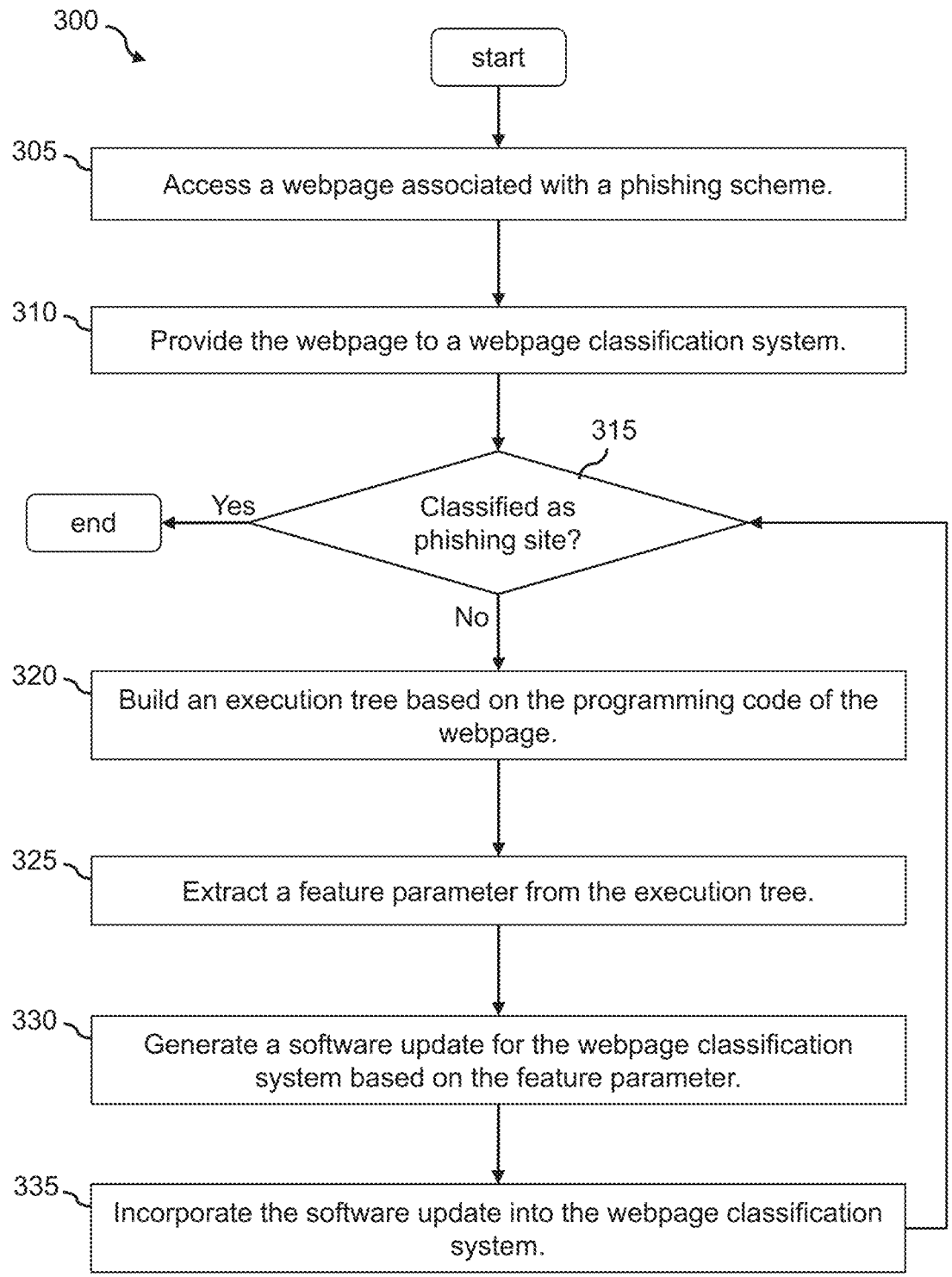
FIG. 3 is a flowchart showing a process of modifying a webpage classification system for classifying webpages according to an embodiment of the present disclosure.

FIG. 3 illustrates a process 300 for modifying a webpage classification system according to one embodiment of the disclosure. In some embodiments, process 300 may be performed by the phishing detection module 132 of the service provider system 130, the webpage classification engine 190, and/or the device 220, though is not limited to being performed by these components. Process 300 begins by accessing (at step 305) a webpage associated with a phishing scheme. For example, the phishing detection manager 202 may use the web crawler 204 to traverse various webpages on the web. Among the webpages traversed by the web crawler 204, the phishing detection manager 202 may determine that one or more webpages are associated with a phishing scheme. In one example, the phishing detection manager 202 may determine that the one or more webpages are associated with the phishing scheme by comparing network addresses of the webpages against a database storing network addresses of webpages known to be associated with a phishing scheme. In another example, the phishing detection manager 202 may present the webpages to a human administrator who determines whether a webpage is a malicious webpage or a non-malicious webpage by manually inspecting the webpages.

Once the webpage associated with the phishing scheme is accessed, process 300 provides (at step 310) the webpage to a webpage classification system and determines (at step 315) whether the webpage classification system correctly classifies the webpage as a phishing website. In some embodiments, the webpage classification system (e.g., the webpage classification engine 190) is configured to automatically classify webpages as a malicious webpage or a non-malicious webpage by analyzing the content (e.g., visual content, non-visual content, etc.) presented by the webpages. In some embodiments, the webpage classification engine 190 may classify that a webpage is a malicious webpage (e.g., the webpage is associated with the phishing scheme) when the webpage includes phishing content. As discussed herein, a phishing webpage usually imitates the appearance of another webpage associated with a legitimate entity (e.g., a merchant webpage associated with the merchant 120, a service provider webpage associated with the service provider system 130, etc.). Thus, the webpage classification engine 190 may determine whether the webpage includes visual content that is similar to the webpage of the legitimate entity. For example, the webpage classification engine 190 may classify the webpage as a malicious webpage (e.g., including phishing content) based on one or more of the following factors: whether the webpage includes a logo associated with the legitimate entity (e.g., a logo of a specific merchant, a specific service provider, etc.), whether the webpage has a layout that corresponds to a different website of the legitimate entity, whether the webpage includes input data fields prompting users to enter sensitive data (e.g., password, financial data, etc.), and whether the network address of the webpage is associated with the legitimate entity.

As such, the phishing detection manager 202 may provide the webpage to the webpage classification engine 190 to determine whether the webpage classification engine 190 can correctly classify the webpage as a malicious webpage. In some embodiments, the webpage classification engine 190 may use the device 220 to access the webpage and classify the webpage based on the content presented on the device 220. If it is determined that the webpage classification engine 190 can correctly classify the webpage as a phishing website, the phishing detection manager 202 may not need to further analyze the webpage. However, if it is determined that the webpage classification engine 190 cannot correctly classify the webpage as a phishing website (e.g., the webpage classification engine 190 classifies the webpage as a non-malicious webpage), the phishing detection module 132 may determine that the webpage includes one or more evasion techniques (e.g., cloaking techniques) that "fools" the webpage classification engine 190. As such, the phishing detection module 132 may further analyze the webpage and modify the webpage classification engine 190 such that the webpage classification engine 190 can correctly classify the webpage and other malicious webpages that implement similar evasion techniques. Thus, at the step 315, when it is determined that the webpage classification system can correctly classify the webpage as a phishing website at the step 315, the process 300 ends. However, if it is determined that the webpage classification system cannot correctly classify the webpage as a phishing website, process 300 proceeds to steps 320-335 to modify the webpage classification system.

In some embodiments, as part of analyzing the webpage, process 300 builds (at step 320) an execution tree based on the programming code of the webpage and extracts (at step 325) a feature parameter from the execution tree. Since the webpage was able to successful bypass the detection from the webpage classification engine 190, in this example, the phishing detection module 132 may conclude that one or more evasion techniques have been implemented within the webpage to bypass the detection techniques of the webpage classification engine 190. For example, programming scripts such as JavaScript® that implements one or more evasion techniques may have been incorporated into the programming code of the webpage. The one or more evasion techniques, when implemented within a webpage, may cause different devices that attempt to access the webpage to present different content, based on different configurations associated with the different devices and/or different interactions performed through the different devices. For example, the webpage may be configured to present different content based on one or more factors, such as a type of application used to access the website (e.g., a type of web browser, a version of a type of web browser, etc.), a geographical location of the device, an Internet Protocol (IP) address associated with the device, a parameter associated with an interaction performed though the device (e.g., a mouse movement, a click, etc.), and/or other factors associated with the device.

Thus, the webpage may be configured to present phishing content (e.g., content for fraudulently obtaining sensitive information from users) only to devices that satisfy a set of conditions (e.g., devices that are located within a geographical region, devices that have IP addresses within one or more predetermined ranges, devices that perform one or more predetermined interactions with the webpage, etc.) and to present non-phishing content (e.g., content that does not imitate a legitimate website, etc.) to devices that do not satisfy the set of conditions. In one example, the set of conditions are determined based on characteristics associated with the webpage classification engine 190 (and/or other known webpage classification systems) such that non-phishing content is presented on devices (e.g., the device 220) associated with the webpage classification engine 190 when accessing the webpage. As such, the evasion techniques may trick the webpage classification engine 190 and may lead to false negatives in the detection of malicious websites by the webpage classification engine 190.

Figure 4:
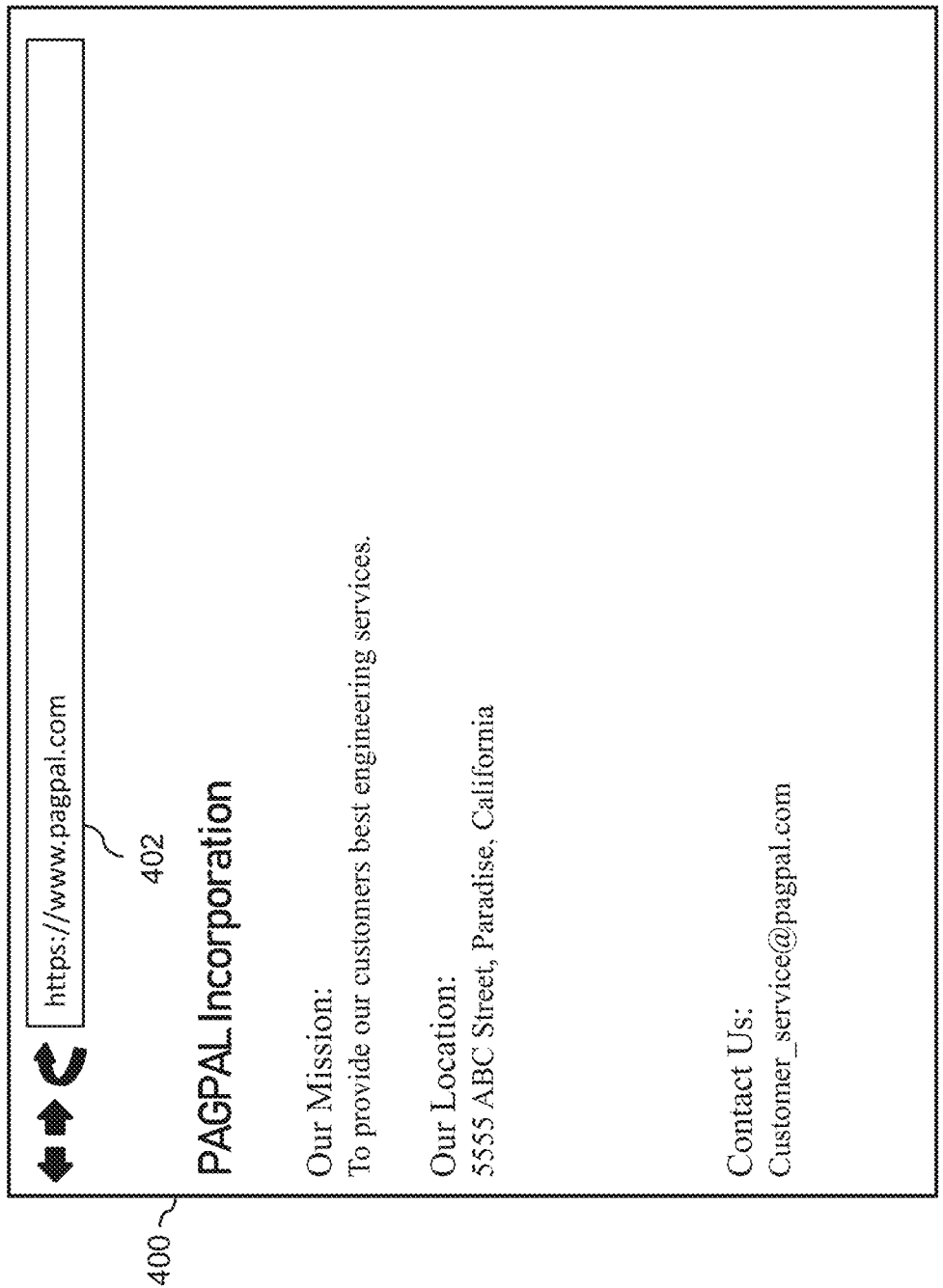
FIG. 4 illustrates non-phishing content associated with a webpage according to an embodiment of the present disclosure.

FIG. 4 illustrates exemplary non-phishing content 400 that a webpage 402 may present to devices (e.g., the device 220) that do not satisfy a set of conditions. As shown, the webpage 402 has a network address (www.pagpal.com), and appears to be a website of a legitimate business, unrelated to a phishing scheme. For example, the non-phishing content 400 of the webpage 402 includes a name of a company ("PAGPAL Incorporation"), a mission statement, a location address for the business, and contact information of the business. When the non-phishing content 400 is presented on the device (e.g., the device 220) as the device 220 accesses the webpage 402, the webpage classification engine 190 may determine that the webpage 402 is a non-malicious webpage based on analyzing the non-phishing content 400 presented on the device 220. For example, the webpage classification engine 190 may determine that the webpage is a non-malicious webpage (e.g., a non-phishing webpage) because the visual content 400 does not include a logo associated with another, legitimate entity, the visual content 400 does not have a layout that is associated with a legitimate entity, and the visual content 400 does not include data input fields that prompt users for sensitive information.

Figure 5:
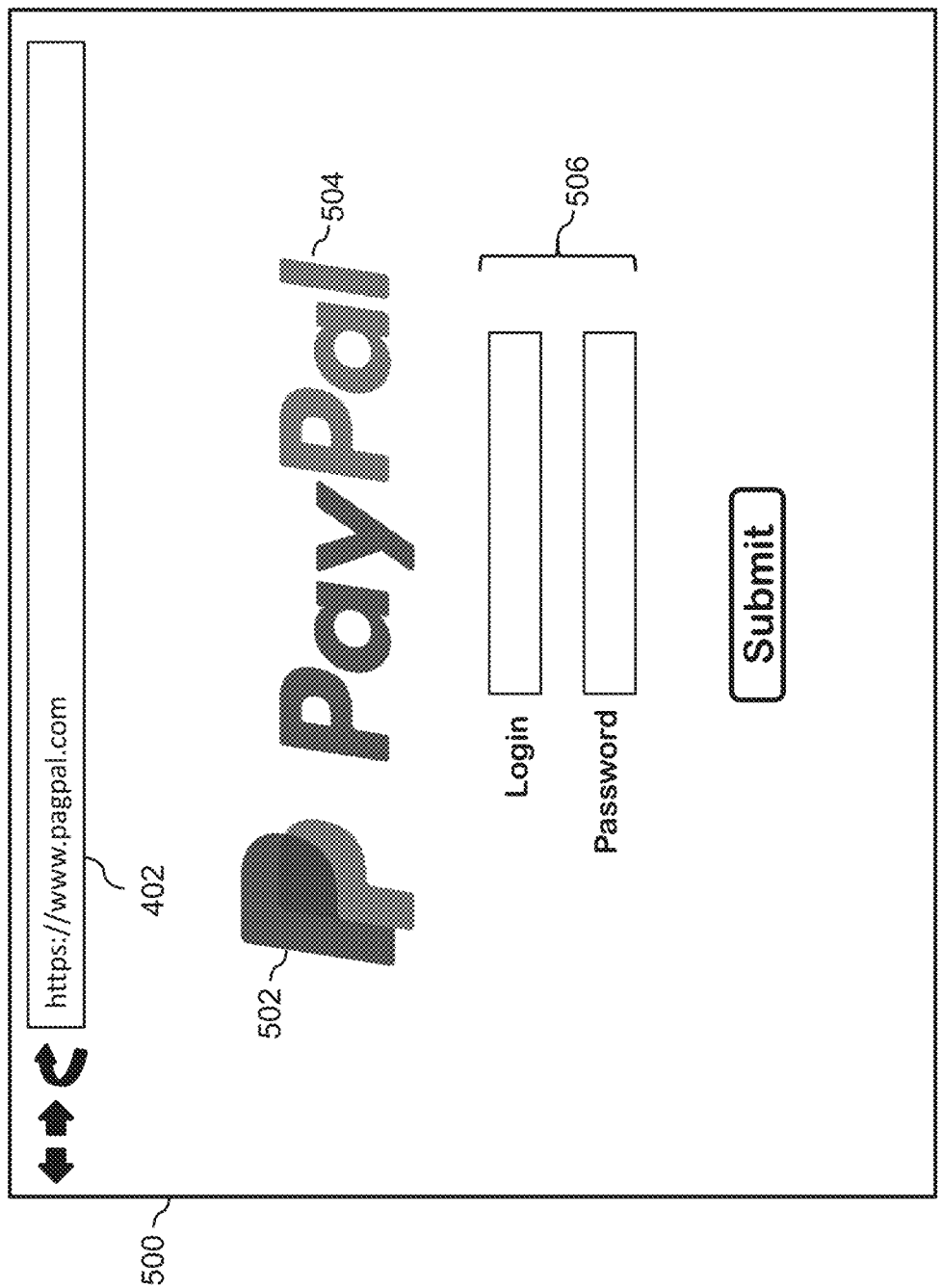
FIG. 5 illustrates phishing content associated with a webpage according to an embodiment of the present disclosure.

On the other hand, the webpage 402 may present different content (e.g., phishing content) to other devices that satisfy the set of conditions. FIG. 5 illustrates exemplary phishing content 500 that the webpage 402 may present to devices that satisfy the set of conditions. As shown, the phishing content 500 includes a logo 502 and a name 504 of a legitimate entity (e.g., PayPal, Inc.) even though the network address (www.pagpal.com) is unrelated to or not associated with the legitimate entity. Furthermore, the network address is similar to the network address (www.paypal.com) of the legitimate entity. In addition, the phishing content 500 includes data input fields 506 that prompts users who access the webpage 402 to provide sensitive data (e.g., username and password). If the phishing content 500 is presented on the device 220 when accessing the webpage 402, the webpage classification engine 190 would likely classify the webpage 402 as a malicious webpage based on analyzing the content 500 presented on the device 220. For example, the webpage classification engine 190 may analyze the visual content 500 and determine that the webpage 402 is a malicious webpage (e.g., a phishing webpage) because the visual content 500 includes a logo associated with a different, legitimate entity (e.g., PayPal, Inc.), the visual content 500 includes a layout that corresponds to a layout of a website associated with the legitimate entity (e.g., the layout similar to the layout of the website: www.paypal.com), the visual content 500 includes data input fields that prompt user for user name and password information, and the network address (www.pagpal.com) is not associated with the legitimate entity. However, the evasion techniques implemented within the webpage 402 causes the device 220 to present the non-phishing content 400 (instead of the phishing content 500), which leads to the webpage classification engine 190 incorrectly classifying the webpage 402 as a non-malicious webpage.

Thus, the phishing detection module 132 may analyze the webpage 402 to determine the type of evasion techniques used by the webpage 402, and modify (e.g., update) the webpage classification engine 190 accordingly such that the webpage classification engine 190 may bypass the one or more evasion techniques and correctly classify malicious webpages, including the webpage 402. In some embodiments, the cloaking detection module 206 may analyze the programming code of the webpage 402 to determine one or more evasion techniques (e.g., cloaking techniques) used in the webpage 402 and may modify the webpage classification engine 190 such that the webpage classification engine 190 may configure the device 220 accordingly to circumvent the evasion techniques. For example, the cloaking detection module 206 may obtain programming code of the webpage 402 that is known to be part of a phishing website. The cloaking detection module 206 may then analyze the programming code of the webpage 402. In some embodiments, the cloaking detection module 206 may determine that the webpage 402 includes programming code associated with one or more evasion techniques. Since the evasion techniques in most instances involve presenting different content based on different conditions, the cloaking detection module 206 of some embodiments may analyze the programming code to determine whether one or more conditional statements exists (e.g., by analyzing programming scripts within the programming code of the webpage).

In some embodiments, the cloaking detection module 206 may build an execution tree based on the conditional statements (e.g., the branches) included in the programming code of the webpage 402. The execution tree may represent possible execution paths when a device (e.g., the device 220) executes the programming code of the webpage 402. Thus, as the cloaking detection module 206 parses the programming code and identifies a conditional statement in the programming code, the cloaking detection module 206 may generate two or more branches in the execution tree representing the different paths for executing the programing code based on whether the condition associated with the conditional statement is satisfied or not. The cloaking detection module 206 may include a leaf node in the tree following an execution path to represent the ultimate action(s) performed by the device accessing the webpage 402 based on whether the set of conditions included in the execution tree is satisfied or not. The ultimate action(s) may be associated with presenting visual content (e.g., the phishing content 500, the non-phishing content 400, etc.) on the device. Thus, by traversing the execution tree, the cloaking detection module 206 may determine under what specific set(s) of conditions would the webpage 402 present phishing content 400 on a device.

In one example, the script within the programming code associated with the website may include the conditional statement:
If screenWidth <100 pixels,
   then serve phishing content,
else if isGerman (browser Language)//if the browser that accesses the webpage has German as a default language
   then serve phishing content,
else serve non-phishing content.

In the above-illustrated example, the cloaking detection module 206 may build an execution tree that includes a first node for a first condition (e.g., the Screen Width condition). From the first node, the cloaking detection module 206 may create two branches—one for satisfying the first condition (e.g., when the device accessing the webpage having a screen width less than 100 pixels, and another branch for not satisfying the first condition (e.g., when the device accessing the webpage not having a screen width less than 100 pixels). The cloaking detection module 206 may add a second node (e.g., a leaf node) indicating to serve phishing content, following the branch associated satisfying the first condition. The cloaking detection module 206 may also add a third node following the branch associated with not satisfying the first condition. The third node may be associated with the second condition (e.g., whether the default language of the browser that accesses the webpage is German). From the second node, the cloaking detection module 206 may also create two branches—one for satisfying the second condition (e.g., when the default language is German), and another branch for not satisfying the second condition (e.g., when the default language is not German). The cloaking detection module 206 may add a fourth node (e.g., a leaf node) indicating to serve phishing content, following the branch associated with satisfying the second condition, and add a fifth node (e.g., a leaf node) indicating to serve non-phishing content, following the branch associated with not satisfying the second condition.

Thus, by traversing the execution tree, the cloaking detection module 206 may determine that the webpage 402 would present first content (e.g., phishing content 500) on the device when it is determined that a particular set of conditions is satisfied and present second content (e.g., non-phishing content 400) on the device when the particular set of conditions is not satisfied. As discussed above, the set of conditions may be associated with one or more configurations of the device (e.g., an application type of an application used to access the webpage, a geographical location of the device, an IP address associated with the device, a default language of the device, whether a cookie is acceptable by the device, a screen resolution, etc.) and/or an interaction performed through the device (e.g., a mouse movement, a click, a timing between interactions, etc.), and other factors. In some embodiments, the cloaking detection module 206 may translate the particular set of conditions to a set of feature parameters (e.g., a set of device parameters).

For example, for a condition that requires that the default language associated with the device to be a particular language (e.g., German), the cloaking detection module 206 may determine a first feature parameter (e.g., a string "German", a short name for German such as "DE", a code such as a numeral value representing the language German, etc.). The first feature parameter may include a particular language (or a set of different languages) required by the condition. When the cloaking detection module 206 determines that the particular set of conditions includes another condition that requires a particular movement of a mouse of the device, the cloaking detection module 206 may determine a second feature parameter (e.g., a mouse movement parameter). The second feature parameter may include (or indicate) a particular movement of the mouse (e.g., moving the mouse a certain amount of pixel distance in a particular direction, etc.).

Referring back to FIG. 3, process 300 then generates (at step 330) a software update for the webpage classification system based on the feature parameter and incorporates (at step 335) the software update into the webpage classification system. For example, the cloaking detection module 206 may modify the webpage classification engine 190 based on the particular set of conditions (and/or the determined feature parameters). In some embodiments, the modification module 208 may generate one or more software updates for the webpage classification engine 190 based on the particular set of conditions (and/or the determined feature parameters) that the cloaking detection module 206 determined from analyzing the webpage 402. The software updates may be generated based on the technologies (e.g., programming language, software architecture, etc.) used to implement the webpage classification engine 190, such that the webpage classification engine 190 may update the software of the webpage classification engine 190 based on the one or more software updates. The modification module 208 may transmit the one or more software updates to the webpage classification engine 190 and/or cause the one or more software updates to be executed at the webpage classification engine 190 to update the software executing on the webpage classification engine 190. The modification to the webpage classification engine 190 may cause the webpage classification engine 190 to use a different device configuration to access the webpages (e.g., the webpage 402) such that it would improve the accuracy of detecting malicious webpages. Details of how the webpage classification engine 190 access and classify webpages will be discussed below by reference to FIG. 6.

After incorporating the software update into the webpage classification system, process 300 reverts back to the step 315 to determine whether the webpage classification system can now correctly classify the webpage as a phishing site. For example, after modifying the webpage classification engine 190, the phishing detection manager 202 may provide the webpage 402 to the webpage classification engine 190 again to determine whether the webpage classification engine 190, after the modification, can correctly classify the webpage 402 as a malicious webpage.

Figure 6:
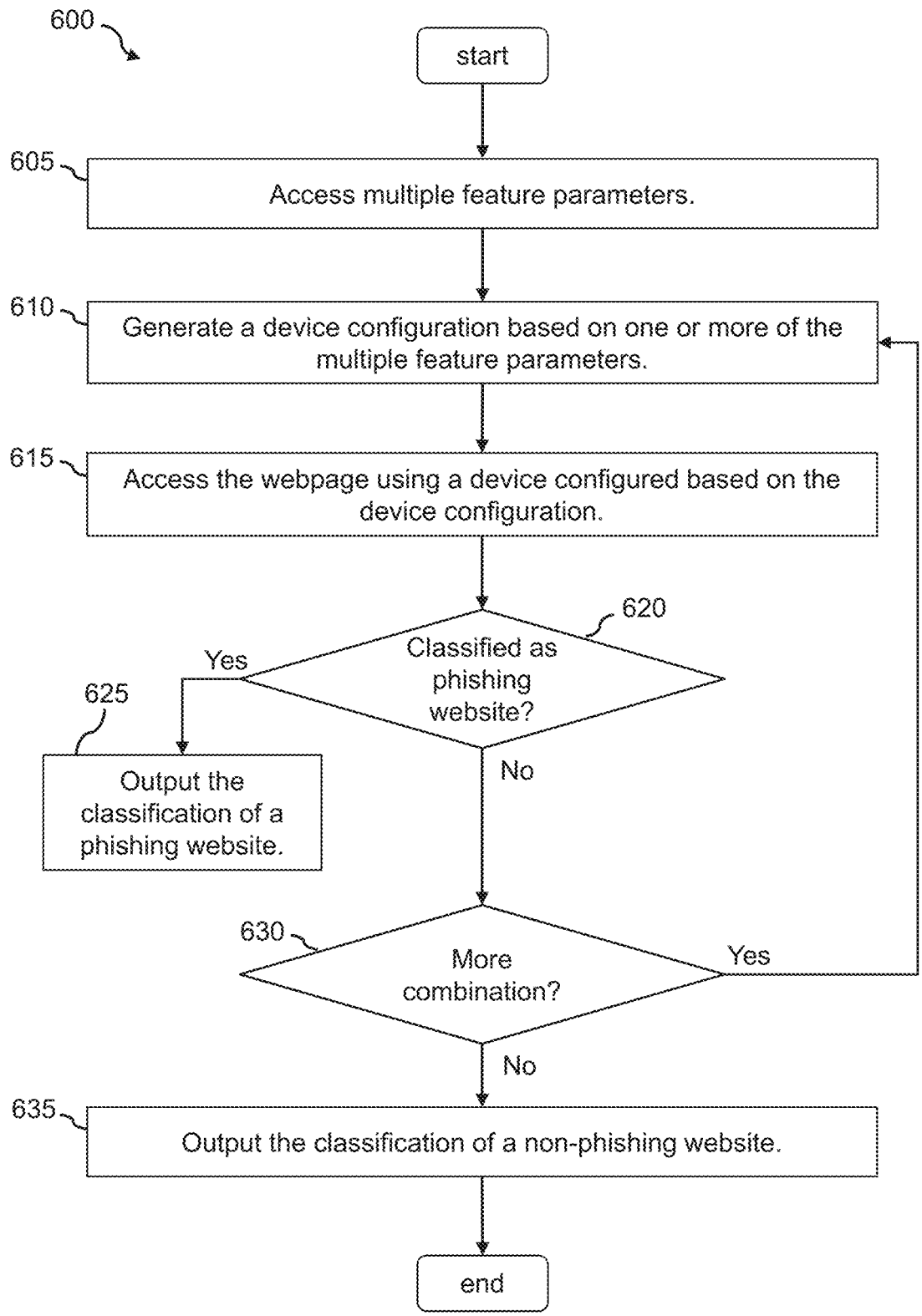
FIG. 6 is a flowchart showing a process of classifying a webpage according to an embodiment of the present disclosure.

FIG. 6 illustrates a process 600 for classifying webpages according to one embodiment of the disclosure. In some embodiments, the process 600 may be performed by the webpage classification engine 190 and the device 220. The process 600 begins by accessing (at step 605) multiple feature parameters associated with the webpage classification system. For example, the webpage classification engine 190 may access feature parameters stored within the webpage classification engine 190. In some embodiments, the feature parameters may include the feature parameters determined by the phishing detection module 132 and incorporated into the webpage classification engine 190 via the software updates provided by the phishing detection module 132. As such, the feature parameters may include the first feature parameter (e.g., a first language such as German) and the second feature parameter (e.g., a mouse movement of a certain amount of pixel distance in a particular direction) determined by the phishing detection module 132 from analyzing the programming code of the webpage 402. In some embodiments, the webpage classification engine 190 may include other feature parameters (pre-existing feature parameters). These other feature parameters may be associated with attributes different from the first and second feature parameters. For example, the other feature parameters may include a third parameter associated with a geographical location of a device, and may include (or indicate) a value associated with a particular geographical location. Furthermore, the other feature parameters may also be associated with attributes that are the same as the first and/or second feature parameters. For example, the other feature parameters may also include a fourth feature parameter that indicate a second default language (e.g., Spanish) (different from the first language). The second language may be used by evasion techniques implemented within another malicious webpage (different from the webpage 402) in the past, and was detected by the phishing detection module 132.

The process 600 then generates (at step 610) a device configuration based on one or more of the multiple feature parameters and accesses (at step 615) the webpage using a device configured based on the device configuration. For example, the webpage classification engine 190 may generate a device configuration based on any one or more (standalone or a combination) of the feature parameters. In some embodiments, the webpage classification engine 190 may first generate device configurations based on a single feature parameter (e.g., the first, second, third, or fourth feature parameter), and when the feature parameters are exhausted based on the single feature parameter, the webpage classification engine 190 may then generate device configurations based on a combination of two or more feature parameters (e.g., a combination of the first and second feature parameters, a combination of the first and third feature parameters, etc.). In one example, the webpage classification engine 190 may generate a first device configuration that includes the first feature parameter (e.g., the first language) and the second feature parameter (e.g., the mouse movement).

The webpage classification engine 190 may then configure a device (e.g., the device 220) based on the first device configuration and cause the device 220 to access a webpage (e.g., the webpage 402 or other webpages). Based on the first device configuration, the device 220 may behave differently when accessing the webpage (compared to the device 220 accessing the same webpage without the device configuration). For example, when the device 220 accesses the webpage (e.g., the webpage 402), the device 220 may be configured to provide the first language (e.g., German) (instead of the actual default language of the device 220) to the webpage in response to an inquiry from the webpage based on the first parameter indicating the first language (spoofing the first language to the webpage), and may be configured to automatically move the mouse according to the second feature parameter when (or after) accessing the webpage.

After accessing the webpage, the process 600 then determines (at step 620) whether the webpage classification system classifies the webpage as a phishing webpage or a non-phishing webpage. For example, the webpage classification engine 190 may access the content presented on the device 220 after accessing the webpage, and determines, based on the content (e.g., the visual content) presented on the device 200, whether the webpage is a malicious webpage (e.g., a phishing webpage) or a non-malicious webpage (e.g., a non-phishing webpage). In some embodiments, the webpage classification engine 190 may classify the webpage as a malicious webpage (e.g., including phishing content) based on the following factors: whether the webpage includes a logo associated with a legitimate entity (e.g., a logo of a specific merchant, a specific service provider, etc.), whether the webpage has a layout that corresponds to a different website of the legitimate entity, whether the webpage includes input data fields prompting users to enter sensitive data (e.g., password, financial data, etc.), and whether the network address of the webpage is not associated with the legitimate entity.

For example, when accessing the webpage 402 using the device 220 configured according to the first device configuration, the webpage 402 may present visual content 500, as shown in FIG. 5. The webpage classification engine 190 may analyze the visual content 500 and determine that the webpage 402 is a malicious webpage (e.g., a phishing webpage) because the visual content 500 includes a logo associated with a different, legitimate entity (e.g., PayPal, Inc.), the visual content 500 includes a layout that corresponds to a layout of a website associated with the legitimate entity (e.g., the layout similar to the layout of the website: www.paypal.com), the visual content 500 includes data input fields that prompt user for user name and password information, and the network address (www.pagpal.com) is not associated with the legitimate entity. When the webpage classification system classifies the webpage (e.g., the webpage 402) as a phishing webpage, the process 600 outputs (at step 625) the classification of a phishing webpage, for example, to the phishing detection module 132.

However, if the webpage presents the visual content 400 on the device 220 (e.g., when the webpage implements an evasion technique that is not known to the webpage classification engine 190), the webpage classification engine 190 may determine that the webpage is a non-malicious webpage (e.g., a non-phishing webpage) because the visual content 400 does not include a logo associated with another, legitimate entity, the visual content 400 does not have a layout that is associated with a legitimate entity, and the visual content 400 does not include data input fields that prompt users for sensitive information. When the webpage classification system does not classify the webpage as a malicious webpage, the process 600 determines if there are more feature parameters or combinations of feature parameters that the webpage classification system have not tried. If there are more feature parameters or combinations of feature parameters, the process 600 reverts back to the step 610 to generate another device configuration based on another one or more of the multiple feature parameters. For example, the webpage classification engine 190 may generate a second device configuration that includes the third feature parameter (e.g., the geographical location) and the fourth feature parameter (e.g., the second language).

The webpage classification engine 190 may then configure a device (e.g., the device 220) based on the second device configuration and cause the device 220 to access the webpage. Based on the second device configuration, the device 220 may behave differently when accessing the webpage (compared to the device 220 accessing the same webpage without the device configuration or according to the first device configuration). For example, when the device 220 accesses the webpage (e.g., the webpage 402), the device 220 may be configured to provide the second language (e.g., Spanish) (instead of the actual IP address of the device 220) to the webpage in response to an inquiry from the webpage based on the fourth parameter indicating the second language (spoofing the second language to the webpage), and may be configured to provide the geographical location indicated in the third feature parameter (instead of the actual geographical location of the device 220) to the webpage in response to an inquiry from the webpage (spoofing the geographical location to the webpage).

The webpage classification engine 190 may then analyze the visual content presented on the device 220 to determine whether the webpage is a malicious webpage or not. If the webpage classification engine 190 has exhausted all of the feature parameters and combinations of feature parameters without determining that the webpage is a malicious webpage, the webpage classification engine 190 may output the classification of a non-malicious webpage (e.g., a non-phishing webpage), as indicated in step 635 of the process 600.

By modifying the webpage classification engine 190 such that the device 220 may be configured differently (and thereby behaving differently) for accessing webpages, the webpage classification engine 190 may bypass one or more evasion techniques implemented in webpages such that the performance of detecting malicious websites may be improved. For example, after modifying the webpage classification engine 190 with the software updates generated based on analyzing the programming code of the webpage 402, the webpage classification engine 190 should be able to bypass the evasion techniques implemented in the webpage 402 and similar evasion techniques implemented in other malicious webpages (e.g., webpages hosted by the phishing servers 170 and 180).

Figure 7:
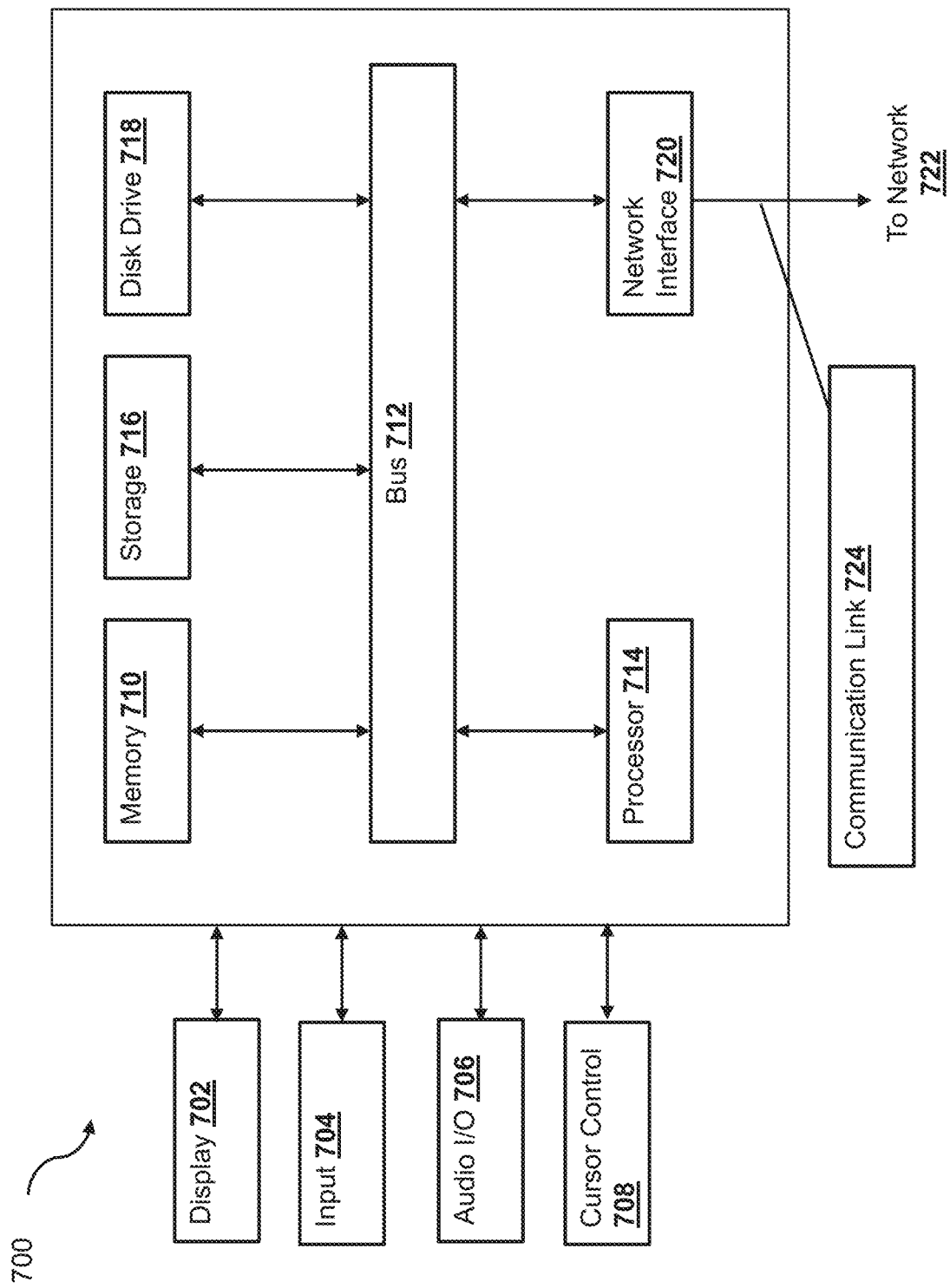
FIG. 7 is a block diagram of a system for implementing a device according to an embodiment of the present disclosure.

FIG. 7 is a block diagram of a computer system 700 suitable for implementing one or more embodiments of the present disclosure, including the service provider system 130, the merchant server 120, the phishing servers 170 and 180, and the user device 110. In various implementations, the user device 110 may include a mobile cellular phone, personal computer (PC), laptop, wearable computing device, etc. adapted for wireless communication, and each of the service provider system 130, the merchant server 120, and the phishing servers 170 and 180 may include a network computing device, such as a server. Thus, it should be appreciated that the devices 110, 120, 170, 180, and 130 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account or a checkout page for purchasing an item from a merchant. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via network 722. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid-state drive, a hard drive). The computer system 700 performs specific operations by the processor 714 and other components by executing one or more sequences of instructions contained in the system memory component 710. For example, the processor 614 can perform the webpage classification functionalities described herein according to the processes 300 and 600.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
causing a device configured according to a first set of device parameters to access a first webpage comprising programming code;
analyzing a first presentation rendered on the device based on executing the programming code;
classifying the first webpage as a non-malicious webpage based on the analyzing the first presentation;
determining that the first webpage is configured to conditionally present different visual content based on different device parameters;
extracting, from the programming code, a first feature parameter that causes the first webpage to present the first visual content;
configuring the device according to a second set of device parameters based on the first feature parameter;
causing the device configured according to the second set of device parameters to execute the programming code of the first webpage;
analyzing a second presentation rendered on the device based on the executing the programming code; and
classifying the first webpage as a malicious webpage based on the analyzing the second presentation.

2. The system of claim 1, wherein the operations further comprise:
generating a software update for the device based on the first feature parameter, wherein the configuring the device comprises incorporating the software update into an application hosted by the device.

3. The system of claim 1, wherein the operations further comprise classifying the first webpage as a phishing webpage based on the analyzing the second presentation.

4. The system of claim 1, wherein the configuring the device according to the second set of device parameters comprises configuring the device to spoof a particular device parameter value corresponding to the first feature parameter when accessing the first webpage.

5. The system of claim 4, wherein the first feature parameter comprises at least one of a geo-location of the device, a network address of the device, a browser language, an operating system, a browser application type, or a cookie access parameter of the device.

6. The system of claim 1, wherein the configuring the device according to the second set of device parameters comprises configuring the device to, when accessing the first webpage, perform a particular interaction with the first webpage without requiring a human input.

7. The system of claim 1, wherein the operations further comprise:
determining that the first feature parameter is not one of a plurality of known feature parameters associated with one or more phishing schemes.

8. A method, comprising:
causing, by one or more hardware processors, a device configured according to a first set of device parameters to access a first webpage comprising programming code;
determining, by the one or more hardware processors, that first visual content rendered on the device configured according to the first set of device parameters is not associated with a phishing scheme;
analyzing, by the one or more hardware processors, the programming code of the first webpage;
determining, by the one or more hardware processors, one or more device parameter values that cause the first visual content to be presented when accessing the first webpage based on the analyzing the programming code of the first webpage;
configuring, by the one or more hardware processors, the device according to a second set of device parameters based on the one or more device parameter values;
causing, by the one or more hardware processors, the device configured according to the second set of device parameters to access the first webpage; and
determining, by the one or more hardware processors, that second visual content rendered on the device configured according to the second set of device parameters is associated with the phishing scheme; and
classifying the first webpage as a malicious webpage based on the determining that the second visual content is associated with the phishing scheme.

9. The method of claim 8, further comprising:
generating a plurality of different sets of device parameters; and
causing the device to access the first webpage under each of the plurality of different sets of device parameters.

10. The method of claim 8, further comprises:
causing the device configured according to the second set of device parameters to access a second webpage; and
classifying the second webpage based on third visual content rendered on the device.

11. The method of claim 8, further comprising analyzing the second visual content rendered on the device, wherein the second content is determined to be associated with the phishing scheme based on the analyzing the second visual content.

12. The method of claim 8, wherein the analyzing the programming code comprises building an execution tree based on the programming code, and wherein the one or more device parameter values are determined based on the execution tree.

13. The method of claim 8, wherein the one or more device parameter values comprise at least one of a network address, a geographical location, a cookie acceptance parameter threshold, or a mouse movement parameter threshold.

14. The method of claim 8, further comprising blacklisting the second webpage based on the classifying the second webpage as a malicious webpage.

15. A non-transitory machine-readable medium having stored thereon machine-readable instructions executable to cause a machine to perform operations comprising:
causing a device configured according to a first set of device parameters to access a first webpage comprising programming code;
analyzing first visual content rendered on the device based on executing the programming code;
classifying the first webpage as a non-malicious webpage based on the analyzing the first visual content;
determining, based on analyzing the programming code, that the first webpage is configured to present different visual content depending on different device parameters;
extracting, from the programming code, a first feature parameter from the different device parameters;
configuring the device according to a second set of device parameters based on the first feature parameter;
causing the device configured according to the second set of device parameters to access the first webpage;
analyzing second visual content rendered on the device based on the executing the programming code; and
classifying the first webpage as a malicious webpage based on the analyzing the second visual content.

16. The non-transitory machine-readable medium of claim 15, wherein the operations further comprise determining that the second visual content is associated with a phishing scheme.

17. The non-transitory machine-readable medium of claim 15, wherein the causing the device configured according to the second set of device parameters to access the first webpage comprises causing the device to spoof the first feature parameter when accessing the second webpage.

18. The non-transitory machine-readable medium of claim 15, wherein the causing the device configured according to the second set of device parameters to access the second webpage comprises causing the device to interact with the first webpage according to the first feature parameter without requiring a human input.

19. The non-transitory machine-readable medium of claim 15, wherein the operations further comprise;
causing the device configured according to the second set of device parameters to access a second webpage; and
classifying the second webpage as a nonmalicious webpage based on determining that third visual content associated with the second webpage rendered on the device.

20. The non-transitory machine-readable medium of claim 15, wherein the first feature parameter comprises at least one of a network address parameter, a geographical location parameter, a cookie acceptance parameter, a browser language, an operating system, a browser application type, or a mouse movement parameter.

* * * * *